US011887520B2

(12) United States Patent
Lin et al.

(10) Patent No.: US 11,887,520 B2
(45) Date of Patent: Jan. 30, 2024

(54) CHIPSET FOR FRAME RATE CONTROL AND ASSOCIATED SIGNAL PROCESSING METHOD

(71) Applicant: Realtek Semiconductor Corp., HsinChu (TW)

(72) Inventors: Tien-Hung Lin, HsinChu (TW); Chia-Wei Yu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 61 days.

(21) Appl. No.: 17/740,334

(22) Filed: May 9, 2022

(65) Prior Publication Data

US 2023/0047492 A1 Feb. 16, 2023

(30) Foreign Application Priority Data

Aug. 13, 2021 (TW) ................................ 110129949

(51) Int. Cl.
*G09G 3/04* (2006.01)

(52) U.S. Cl.
CPC ....... *G09G 3/04* (2013.01); *G09G 2320/0693* (2013.01); *G09G 2340/0435* (2013.01); *G09G 2360/00* (2013.01)

(58) Field of Classification Search
None
See application file for complete search history.

(56) References Cited

U.S. PATENT DOCUMENTS 7,940,241 B2 5/2011 Bae
2009/0322661 A1* 12/2009 Bae ...................... G09G 3/3648 345/87
2013/0034160 A1* 2/2013 Schmit .................. H04N 19/43 375/E7.125
2015/0016748 A1* 1/2015 Ko ........................... G06T 1/20 382/299
2022/0078407 A1* 3/2022 Zhao ................... H04N 19/176

FOREIGN PATENT DOCUMENTS

CN 202206487 U 4/2012

* cited by examiner

*Primary Examiner* — Yingchun He
(74) *Attorney, Agent, or Firm* — Winston Hsu

(57) ABSTRACT

The present invention provides a chipset for FRC, wherein the chipset includes a first FRC chip and a second FRC chip. The first FRC chip is configured to receive a first part of input image data, and perform a motion compensation on the first part of the input image data to generate a first part of an output image data, wherein a frame rate of the output image data is greater than or equal to a frame rate of the input image data. The second FRC chip is configured to receive a second part of the input image data, and perform the motion compensation on the second part of the input image data to generate a second part of the output image data; wherein the first part and the second part of the output image data are combined into the complete output image data for displaying on a display panel.

14 Claims, 4 Drawing Sheets

CHIPSET FOR FRAME RATE CONTROL AND ASSOCIATED SIGNAL PROCESSING METHOD

BACKGROUND OF THE INVENTION

1. Field of the Invention

The present invention relates to a frame rate control chip.

2. Description of the Prior Art

Motion estimation and motion compensation (MEMC) is a method commonly used for frame rate control, especially for generating interpolated frames when the frame rate increases. In a frame rate control chip, a memory within the chip is designed to temporarily store image data, and a size of the memory is determined based on a pixel rate of the image data or a frame resolution. However, since display products have many different specifications, the size of the memory required by the frame rate control chip corresponding to different products is also different. For example, if the specifications of multiple display products include 8 k*4 k*60 Hz (i.e., the resolution is 7680*4320, and the refresh rate is 60 Hz) and 8 k*4 k*120 Hz (i.e., the resolution is 7680*4320, and the refresh rate is 120 Hz), the pixel rates of the two specifications are approximately 2.38*10^9 pixels per second and 4.75*10^9 pixels per second, respectively, the internal memories and processing circuits of the frame rate control chips for the two specifications will also have different designs. Therefore, if a dedicated frame rate control chip is to be designed for each display product, the design cost will be greatly increased.

SUMMARY OF THE INVENTION

It is therefore an objective of the present invention to provide a method that can combine a plurality of frame rate control chips as a frame rate control chipset that meets another specification, so as to reduce the design cost of the frame rate control chip, to solve the problems described in the prior art.

According to one embodiment of the present invention, a chipset used for frame rate control (FRC) is disclosed, wherein the chipset comprises a first FRC chip and a second FRC chip. The first FRC chip is configured to receive a first part of input image data, and perform a motion compensation on the first part of the input image data to generate a first part of an output image data, wherein a frame rate of the output image data is greater than or equal to a frame rate of the input image data. The second FRC chip is configured to receive a second part of the input image data, and perform the motion compensation on the second part of the input image data to generate a second part of the output image data; wherein the first part of the output image data and the second part of the output image data are combined into the complete output image data for displaying on a display panel.

According to one embodiment of the present invention, an image processing method comprises the steps of: using a first FRC chip to receive a first part of input image data, and perform a motion compensation on the first part of the input image data to generate a first part of an output image data, wherein a frame rate of the output image data is greater than or equal to a frame rate of the input image data; and using a second FRC chip to receive a second part of the input image data, and perform the motion compensation on the second part of the input image data to generate a second part of the output image data; wherein the first part of the output image data and the second part of the output image data are combined into the complete output image data for displaying on a display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
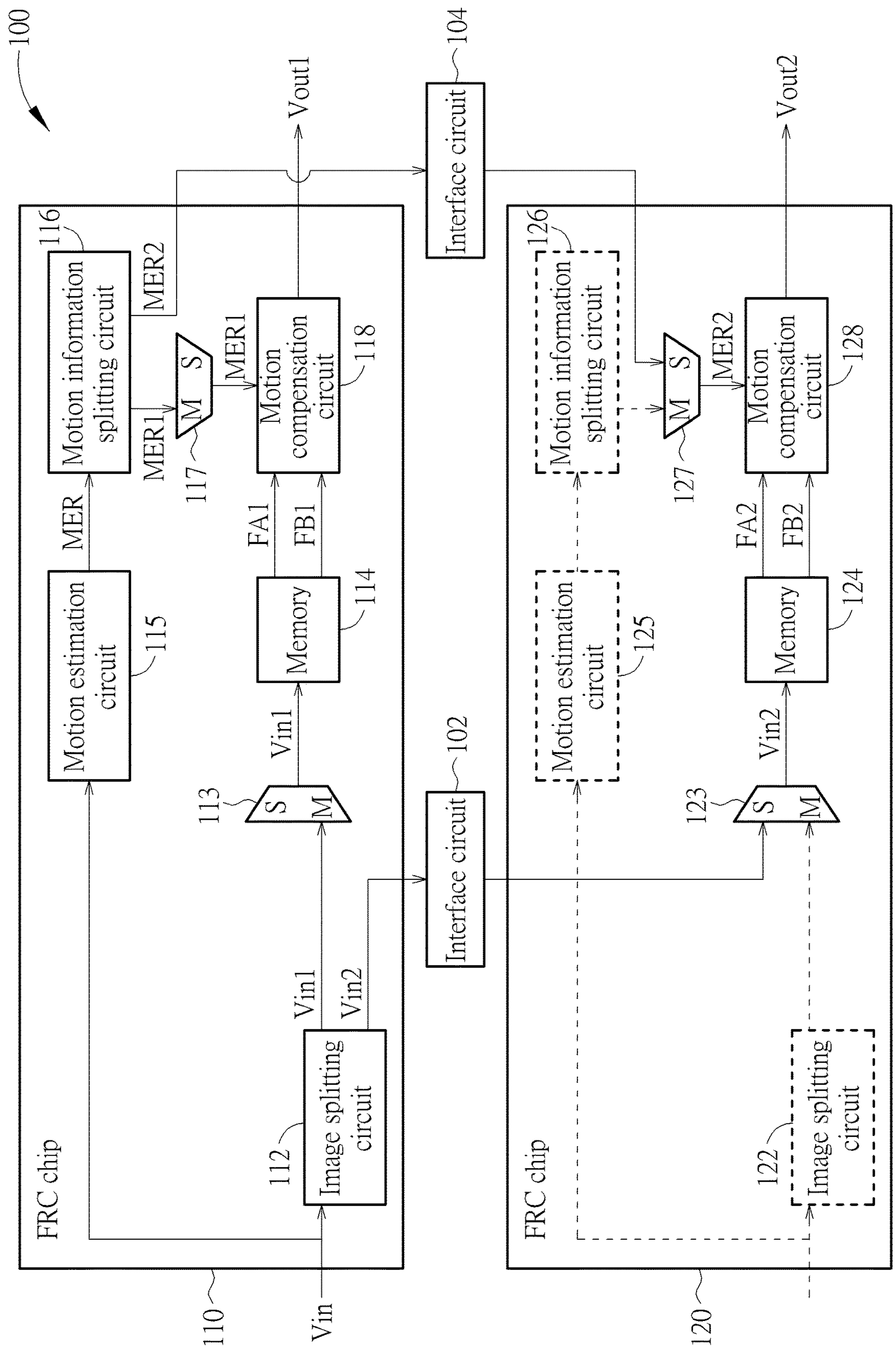
FIG. 1 is a diagram illustrating a chipset according to one embodiment of the present invention.

FIG. 1 is a diagram illustrating a chipset 100 according to one embodiment of the present invention. As shown in FIG. 1, the chipset 100 comprises two FRC chips 110 and 120, wherein the FRC chip 110 comprises an image splitting circuit 112, a multiplexer 113, a memory 114, a motion estimation circuit 115, a motion information splitting circuit 116, a multiplexer 117 and a motion compensation circuit 118; and the FRC chip 120 comprises an image splitting circuit 122, a multiplexer 123, a memory 124, a motion estimation circuit 125, a motion information splitting circuit 126, a multiplexer 127 and a motion compensation circuit 128; and the FRC chips 110 and 120 are connected to each other via interface circuits 102 and 104. In this embodiment, the interface circuits 102 and 104 can include any components that can be used to transfer data for the FRC chips 110 and 120, such as transmission lines, pad/pins on the circuit board, etc. In addition, the chipset 100 can be positioned in any electronic device that needs to perform image frame rate conversion, such as mobile phones, tablet computers, TVs, monitors, laptops, TV boxes, etc.

In this embodiment, each of the FRC chips 110 and 120 can be used independently in an electronic device with a first display specification. For example, the FRC chip 110 can be independently used in the electronic device with a display specification of 8 k*4 k*60 Hz to perform the frame rate conversion on input image data Vin to generate output image data Vout1. FRC chips 110 and 120 can also be used together as the chipset 100 for use in an electronic device with a second display specification. For example, the chipset 100 can be used in the electronic device with a display specification of 8 k*4 k*120 Hz to perform the frame rate conversion on the input image data Vin to generate output image data Vout1 and Vout2. In other words, as shown in FIG. 1, when the designer needs to design FRC chips for an electronic device with a first display specification and an electronic device with a second display specification at the same time, for the hardware design, the designer only needs to consider a single FRC chip 110 that meets the first display specification. If it needs to be applied to an electronic device with the second display specification, the designer only needs to combine two FRC chips that meet the first specification to obtain a chipset that meets the second specification, so the design cost can be greatly reduced.

In this embodiment, the FRC chips 110 and 120 have the same hardware architecture. In other embodiments of the present invention, however, the hardware architectures of the FRC chips 110 and 120 may not be exactly the same, that is, the FRC chip 110 can be used independently in the electronic device with the first display specification, the FRC chip 120 can be used independently in the electronic device with a third display specification, and the chipset 100 containing the FRC chips 110 and 120 can be used in the electronic device with the second display specification.

Figure 2:
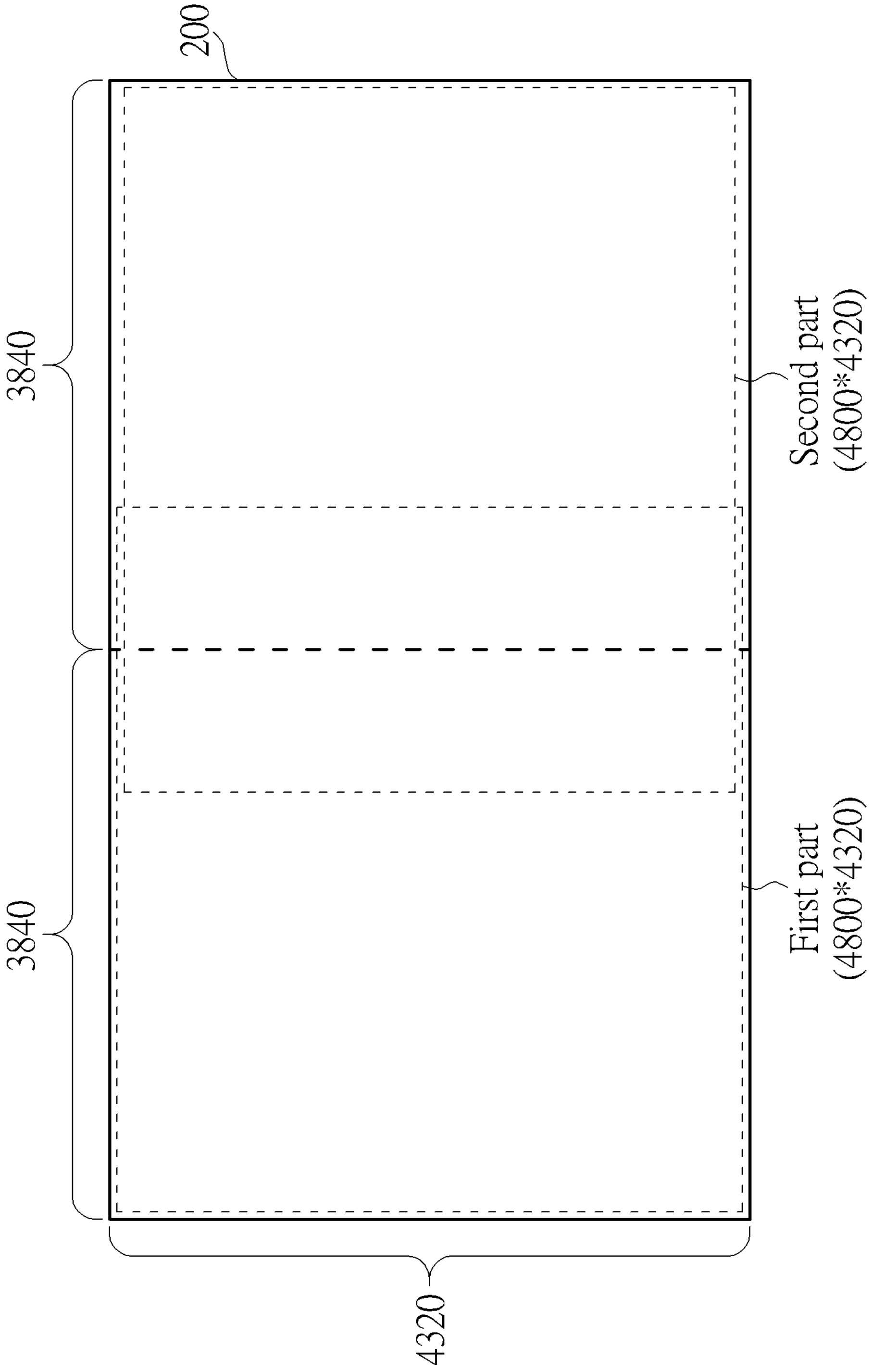
FIG. 2 is a diagram of an image splitting circuit splitting a frame into a first part and a second part according to one embodiment of the present invention.

Specifically, in the operation of the chipset 100, the image splitting circuit 112 in the FRC chip 110 receives the input image data Vin, and splits the input image data Vin into two parts. For example, the input image data Vin includes data of multiple frames, and FIG. 2 shows a diagram of a frame 200, where the frame 200 includes pixel values of multiple pixels, for example, 7680*4320 pixel values as shown in FIG. 2. The image splitting circuit 112 can split the frame 200 into a first part and a second part, where the first part includes the pixel values of left area of the frame 200, and the second part includes the right area of the frame 200. In this embodiment, in order to facilitate subsequent operations of the motion estimation circuit 115, the first part includes not only the 3840*4320 pixels on the left area of the frame 200, but also the pixels in a part of the area from the center of the frame 200 to the right. For example, the first part can contain 4800*4320 pixels. Similarly, the second part includes not only the 3840*4320 pixels on the right area of the frame 200, but also the pixels in a part of the area from the center of the frame 200 to the left. For example, the second part can contain 4800*4320 pixels.

It is noted that the frame 200, the first part, and the second part shown in FIG. 2 are merely illustrative, and not a limitation of the present invention. In other embodiments, the frame 200 can have different resolutions, and as long as the first part and the second part contain all the pixel values of the frame 200, and the first part and the second part are partially overlapped, all related designs should fall within the scope of the present invention.

The image splitting circuit 112 sequentially splits each frame in the input image data Vin to generate first image data Vin1 and second image data Vin2, where the first image data Vin1 may be the first part shown in FIG. 2, and the second image data Vin2 may be the second part shown in FIG. 2. The first image data Vin1 is directly sent to the multiplexer 113, and the multiplexer 113 is controlled to send the first image data Vin1 to the memory 114. The second image data Vin2 is sent to the FRC chip 120 via the interface circuit 102, and the multiplexer 123 is controlled to send the second image data Vin2 to the memory 124.

In this embodiment, the FRC chip 110 serves as a master device, and the FRC chip 120 serves as a slave device. Taking into account the consistency of the motion estimation operation, the motion estimation circuit 115 in the FRC chip 110 will perform motion estimation on the input image data Vin to determine motion information MER of each frame for use by the FRC chips 110 and 120. In this embodiment, the motion information MER mainly includes motion vectors, and since the operation of the motion estimation circuit 115 is well known to a person skilled in the art, for example, a block matching algorithm is used to generate the motion vector, the details of the motion estimation circuit 115 are omitted here.

Then, the motion information splitting circuit 116 splits the motion information MER into two parts to generate a first part MER1 of the motion information and a second part MER2 of the motion information. The first part MER1 of the motion information corresponds to the first part of the frame 200 shown in FIG. 2, that is, the first part MER1 of the motion information contains the motion vectors of the blocks within the first part of the frame 200. The second part MER2 of the motion information corresponds to the second part of the frame 200 shown in FIG. 2, that is, the second part MER2 of the motion information contains the motion vectors of the blocks within the second part of the frame 200. The first part MER1 of the motion information is sent to the multiplexer 117, and the multiplexer 117 is controlled to send the first part MER1 of the motion information to the motion compensation circuit 118. In addition, the second part MER2 of the motion information is sent to the multiplexer 127 of the FRC chip 120 via the interface circuit 104, and the multiplexer 127 is controlled to send the second part MER2 of the motion information to the motion compensation circuit 128.

Figure 3:
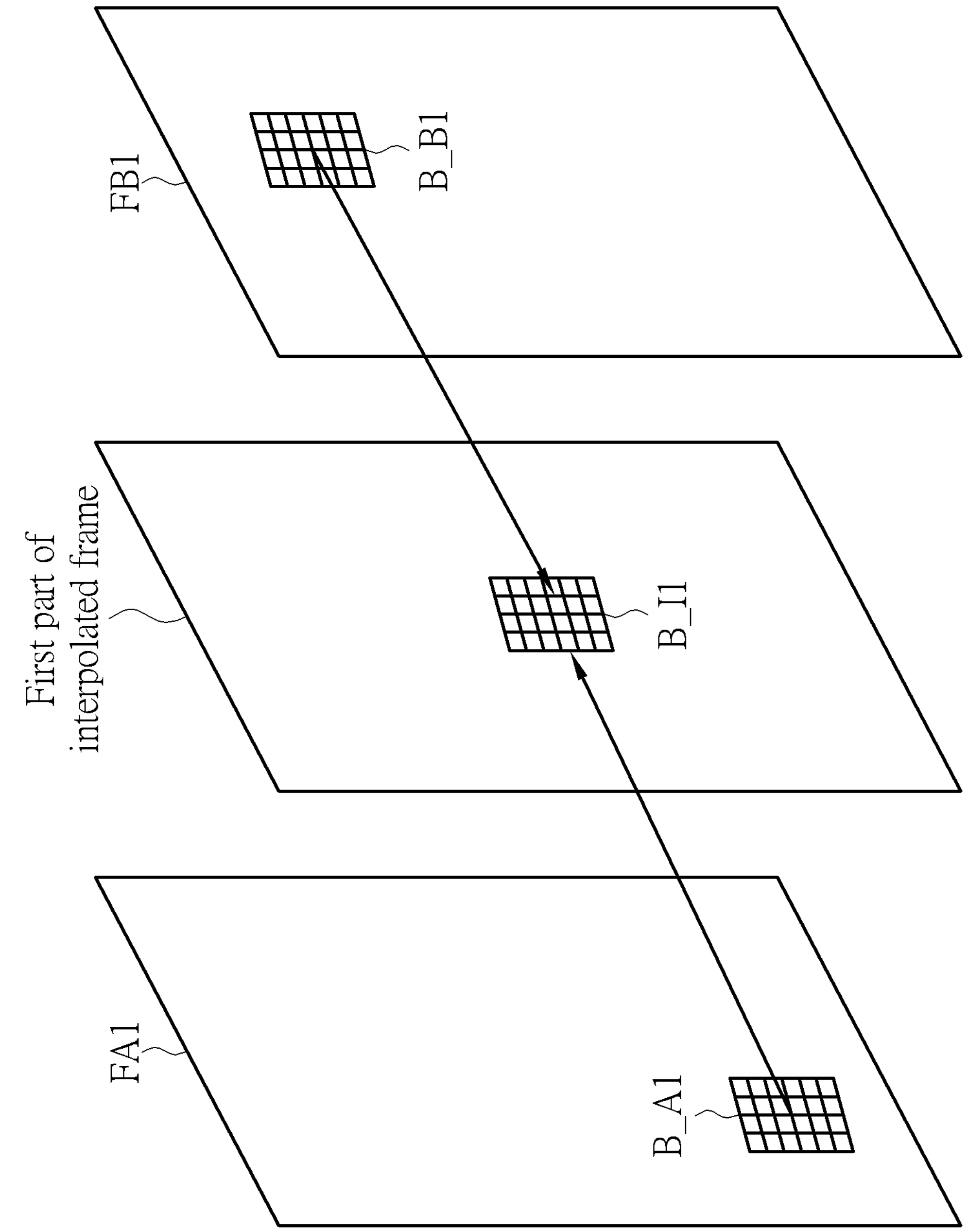
FIG. 3 is a diagram of generating a first part of an interpolated frame.

In the operation of the motion compensation circuit 118, the motion compensation circuit 118 reads the first part FA1 of a first reference frame and the first part FB1 of a second reference frame from the memory 114, wherein the first part FA1 of the first reference frame corresponds to the first part shown in FIG. 2, and the first part FB1 of the second reference frame can also correspond to the first part shown in FIG. 2. Referring to FIG. 3, the motion compensation circuit 118 is used to generate a first part of the interpolated frame according to the first part FA1 of the first reference frame and the first part FB1 of the second reference frame. For example, the motion compensation circuit 118 may refer to a block B_A1 and related motion vector in the first part FA1 of the first reference frame, and refer to a block B_B1 and related motion vector in the first part FB1 of the second reference frame, to determine the location and pixel values of a block B_I1 of the first part of the interpolated frame. It is noted that since the calculation method of the interpolated frame in the motion compensation circuit 118 is well known to a person skilled in the art, and the focus of the present invention is not on the motion compensation algorithm, the details of the motion compensation circuit 118 are omitted here.

Figure 4:
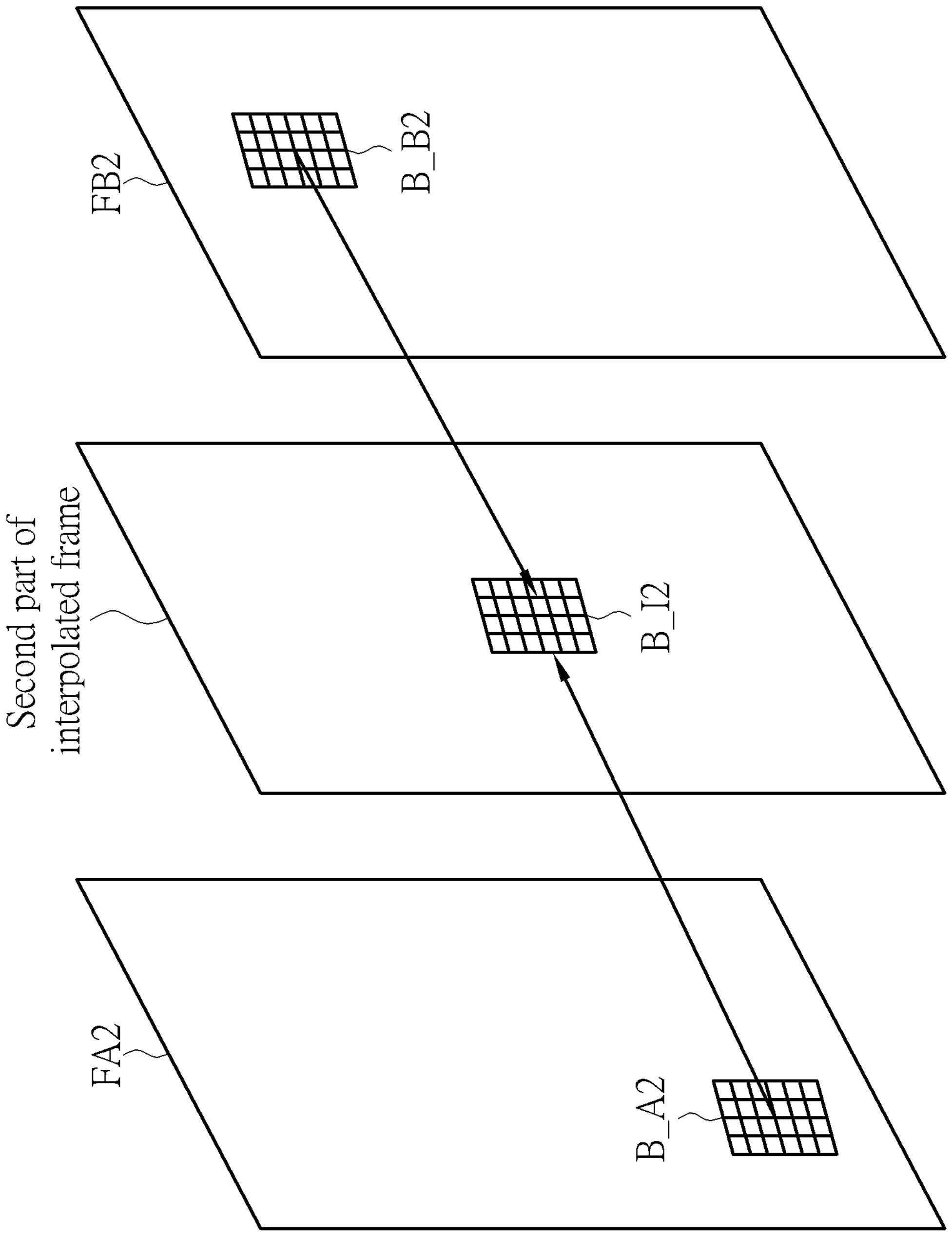
FIG. 4 is a diagram of generating a second part of the interpolated frame.

Similarly, in the operation of the motion compensation circuit 128, the motion compensation circuit 128 reads the second part FA2 of the first reference frame and the second part FB2 of the second reference frame from the memory 124, wherein the second part FA2 of the first reference frame corresponds to the second part shown in FIG. 2, and the second part FB2 of the second reference frame can also correspond to the second part shown in FIG. 2. Referring to FIG. 4, the motion compensation circuit 128 is used to generate a second part of the interpolated frame according to the second part FA2 of the first reference frame and the second part FB2 of the second reference frame. For example, the motion compensation circuit 128 may refer to a block B_A2 and related motion vector in the second part FA2 of the first reference frame, and refer to a block B_B2 and related motion vector in the second part FB2 of the second reference frame, to determine the location and pixel values of a block B_I2 of the second part of the interpolated frame.

Finally, the motion compensation circuit 118 in the FRC chip 110 outputs the first parts of the multiple frames including the interpolated frame (for example, each first part only includes the 4800*4320 pixel values on the left side of the frame, or each first part only includes the 3840*4320 pixel values of the left side of the frame) as the output image data Vout1, the motion compensation circuit 128 in the FRC chip 120 outputs the second parts of the multiple frames including the interpolated frame (for example, each second part only includes the 4800*4320 pixel values on the right side of the frame, or each second part only includes the 3840*4320 pixel values of the right side of the frame) as the output image data Vout2, and the output image data Vout1 and Vout2 will be sent to a back-end processing circuit for combination to be displayed on the display panel.

As described in the above embodiment, since the FRC chip 110 and the FRC chip 120 are respectively responsible for processing part of the frame, sizes of memory 114 and the memory 124 does not need to be large, so as to reduce the manufacturing cost of a single FRC chip 110/120.

It should be noted that since the FRC chip 110 serves as the master device and the FRC chip 120 serves as the slave device, the image splitting circuit 122, the motion estimation circuit 125 and the motion information splitting circuit 126 in the FRC chip 120 can be disabled without any operation, so as to save the power consumption of the FRC chip 120.

In the embodiment shown in FIG. 1, the input image data Vin is split by the image splitting circuit 112 in the FRC chip 110 to generate the first image data Vin1 and second image data Vin2, for use by the FRC chips 110 and 120, respectively. However, the present invention is not limited to this. In other embodiments of the present invention, the input image data Vin can be simultaneously inputted into the FRC chips 110 and 120, and the image splitting circuit 112 in the FRC chip 110 captures the first image data Vin1 of the input image data Vin and sends it to the memory 114, and the image splitting circuit 122 in the FRC chip 120 captures the second image data Vin2 of the input image data Vin and sends it to the memory 124. This alternative design should fall within the scope of the present invention.

In the embodiment shown in FIG. 1, the motion information of each frame is all generated by the motion estimation circuit 115 in the FRC chip 110, and the first part MER1 of the motion information is used by the motion compensation circuit 118, and the second part MER2 of the motion information is sent to the motion compensation circuit 128 of the FRC chip 120 for use. However, the present invention is not limited to this. In other embodiments of the present invention, the motion estimation circuit 125 in the FRC chip 120 can also be used to generate motion information. In other words, the motion estimation circuit 115 in the FRC chip 110 can perform motion estimation on the input image data Vin to generate the first part MER1 of the motion information, and the motion estimation circuit 125 in the FRC chip 120 can perform motion estimation on the input image data Vin to generate the second part MER2 of the sports information. This alternative design should fall within the scope of the present invention.

Briefly summarized, in the present invention, by combining the FRC chips 110 and 120 that could be used independently with the first display specification into a chipset for use by electronic devices with the second display specification, the chip or chipset can be applied to two or more electronic products with different display specifications while only needing to design the hardware architecture of one chip, so as to greatly reduce the design cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A chipset for frame rate control (FRC), comprising:

a first FRC chip, configured to receive input image data, and perform a motion compensation on a first part of the input image data to generate a first part of an output image data, wherein a frame rate of the output image data is greater than or equal to a frame rate of the input image data; and a second FRC chip, configured to receive a second part of the input image data, and perform the motion compensation on the second part of the input image data to generate a second part of the output image data;

wherein the first part of the output image data and the second part of the output image data are combined into complete output image data for displaying on a display panel;

wherein the first FRC chip splits the input image data into the first part of the input image data and the second part of the input image data, wherein the first part of the input image data is stored in a memory of the first FRC chip, and the second part of the input image data is sent to the second FRC chip.

2. The chipset of claim 1, wherein the output image data comprises a plurality of frames, the first part of the input image data comprises a first part of each frame, and the second part of the input image data comprises a second part of each frame; and for each frame, the first part of the frame and the second part of the frame comprise all pixel values of the frame, and pixel values of the first part of the frame and pixel values of the second part of the frame are partially overlapped.

3. The chipset of claim 2, wherein the output image data comprises a plurality of frames and a plurality of interpolated frames, the first part of the output image data comprises a first part of each of the plurality of frames and the plurality of interpolated frames, and the second part of the output image data comprises a second part of each of the plurality of frames and the plurality of interpolated frames; and for each interpolated frame, the first part of the interpolated frame and the second part of the interpolated frame comprise all pixel values of the interpolated frame.

4. The chipset of claim 1, wherein the first FRC chip performs motion estimation on the input image data to generate motion information, and performs the motion compensation on the first part of the input image data to generate the first part of the output image data according to a first part of the motion information; and the first FRC chip sends a second part of the motion information to the second FRC chip, and the second FRC chip performs the motion compensation on the second part of the input image data to generate the second part of the output image data according to the second part of the motion information.

5. The chipset of claim 1, wherein the chipset is used in an electronic device having a display panel.

6. A chipset for frame rate control (FRC), comprising:

a first FRC chip, configured to receive input image data, and perform a motion compensation on a first part of the input image data to generate a first part of an output image data, wherein a frame rate of the output image data is greater than or equal to a frame rate of the input image data; and a second FRC chip, configured to receive a second part of the input image data, and perform the motion compensation on the second part of the input image data to generate a second part of the output image data;

wherein the first part of the output image data and the second part of the output image data are combined into complete output image data for displaying on a display panel;

wherein the first FRC chip comprises:

an image splitting circuit, configured to receive the input image data, and split the input image data into the first part of the input image data and the second part of the input image data, wherein the second part of the input image data is sent to the second FRC chip;

a memory, configured to store the first part of the input image data;

a motion estimation circuit, configured to perform motion estimation on the input image data to generate motion information; and a motion compensation circuit, coupled to the memory, configured to read the first part of the input image data from the memory, and perform the motion compensation on the first part of the input image data to generate the first part of the output image data according to a first part of the motion information.

7. The chipset of claim 6, wherein the memory does not store the second part of the input image data.

8. The chipset of claim 6, wherein the first FRC chip further comprises:

a motion information splitting circuit, coupled to the motion estimation circuit, configured to split the motion information into the first part of the motion information and a second part of the motion information, wherein the second part of the motion information is sent to the second FRC chip.

9. The chipset of claim 8, wherein the memory is a first memory, the motion compensation circuit is a first motion compensation circuit, and the second FRC chip comprises:

a second memory, configured to store the second part of the input image data; and a second motion compensation circuit, configured to read the second part of the input image data from the second memory, and perform the motion compensation on the second part of the input image data to generate the second part of the output image data according to the second part of the motion information.

10. An image processing method, comprising:

using a first frame rate control (FRC) chip to receive input image data, and split the input image data into a first part of the input image data and a second part of the input image data;

storing the first part of the input image data into a memory within the first FRC chip;

sending the second part of the input image data to a second FRC chip;

using the first FRC chip to perform a motion compensation on the first part of the input image data to generate a first part of an output image data, wherein a frame rate of the output image data is greater than or equal to a frame rate of the input image data; and using the second FRC chip to perform the motion compensation on the second part of the input image data to generate a second part of the output image data;

wherein the first part of the output image data and the second part of the output image data are combined into complete output image data for displaying on a display panel.

11. The image processing method of claim 10, wherein the output image data comprises a plurality of frames, the first part of the input image data comprises a first part of each frame, and the second part of the input image data comprises a second part of each frame; and for each frame, the first part of the frame and the second part of the frame comprise all pixel values of the frame, and pixel values of the first part of the frame and pixel values of the second part of the frame are partially overlapped.

12. The image processing method of claim 11, wherein the output image data comprises a plurality of frames and a plurality of interpolated frames, the first part of the output image data comprises a first part of each of the plurality of frames and the plurality of interpolated frames, and the second part of the output image data comprises a second part of each of the plurality of frames and the plurality of interpolated frames; and for each interpolated frame, the first part of the interpolated frame and the second part of the interpolated frame comprise all pixel values of the interpolated frame.

13. The image processing method of claim 10, wherein the step of using the first FRC chip to receive the first part of input image data, and perform the motion compensation on the first part of the input image data to generate the first part of the output image data comprises:

using the first FRC chip to perform the motion estimation on the input image data to generate motion information;

performing the motion compensation on the first part of the input image data to generate the first part of the output image data according to a first part of the motion information;

sending a second part of the motion information to the second FRC chip; and using the second FRC chip to perform the motion compensation on the second part of the input image data to generate the second part of the output image data according to the second part of the motion information.

14. The image processing method of claim 10, wherein the first FRC chip and the second FRC chip are used in an electronic device having a display panel.

* * * * *